United States Patent [19]
Gerber

[11] 3,759,433
[45] Sept. 18, 1973

[54] METHOD AND APPARATUS FOR TRANSPORTING A STRIP OF RECORDING MATERIAL

[75] Inventor: Heinz Joseph Gerber, West Hartford, Conn.

[73] Assignee: The Gerber Scientific Instrument Company, South Windsor, Conn.

[22] Filed: Nov. 10, 1970

[21] Appl. No.: 88,259

[52] U.S. Cl. .................... 226/54, 226/82, 242/67.3
[51] Int. Cl. ............................................. G03b 1/20
[58] Field of Search ......................................
226/76–87, 54; 346/136; 74/243 F; 242/67.3, 67.4; 352/241

[56] References Cited
UNITED STATES PATENTS

| | | | |
|---|---|---|---|
| 1,281,252 | 10/1918 | Johnson et al. | 74/243 F X |
| 1,873,555 | 8/1932 | Crumrine | 74/243 F |
| 2,762,255 | 9/1956 | Anderson | 226/78 X |
| 3,015,536 | 1/1962 | Nielsen et al. | 346/136 |

Primary Examiner—Richard A. Schacher
Assistant Examiner—Gene A. Church
Attorney—McCormick, Paulding and Huber

[57] ABSTRACT

A feed arrangement for transporting a strip of recording material past a recording pen includes a feed roller and a positioning roller both drivingly engageable with the strip and driven in synchronism. The feed roller is located in advance of the positioning roller and feeds the strip material from a storage roll to the positioning roller. Slack in the strip of recording material is maintained between the feed roller and the positioning roller to remove from the portion of the strip engaged by the positioning roller all forces required to advance the strip of recording material from storage. The feed roller has sprocket pins which engage a first set of apertures along the edge of the recording strip, and the positioning roller also has sprocket pins which engage a second set of apertures along the edge of the recording strip. Since the pins of the positioning roller need exert only small forces on the engaged portion of the strip the possibility of such pins tearing or deforming the strip, with resulting inaccurate positioning of the strip, is eliminated or at least greatly reduced. The positioning roller may be a drum which also supports the recording strip for coaction with the recording pen.

23 Claims, 3 Drawing Figures

PATENTED SEP 18 1973　　　　　　　　　3,759,433
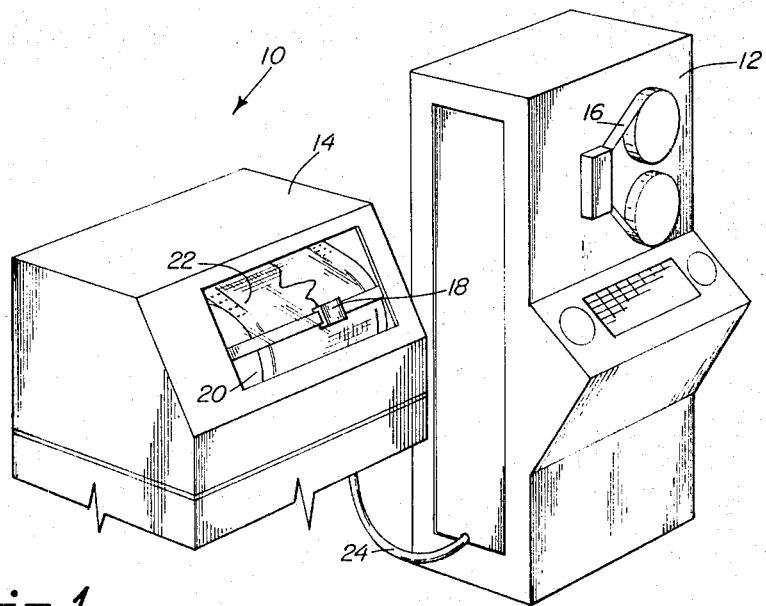
Fig. 1
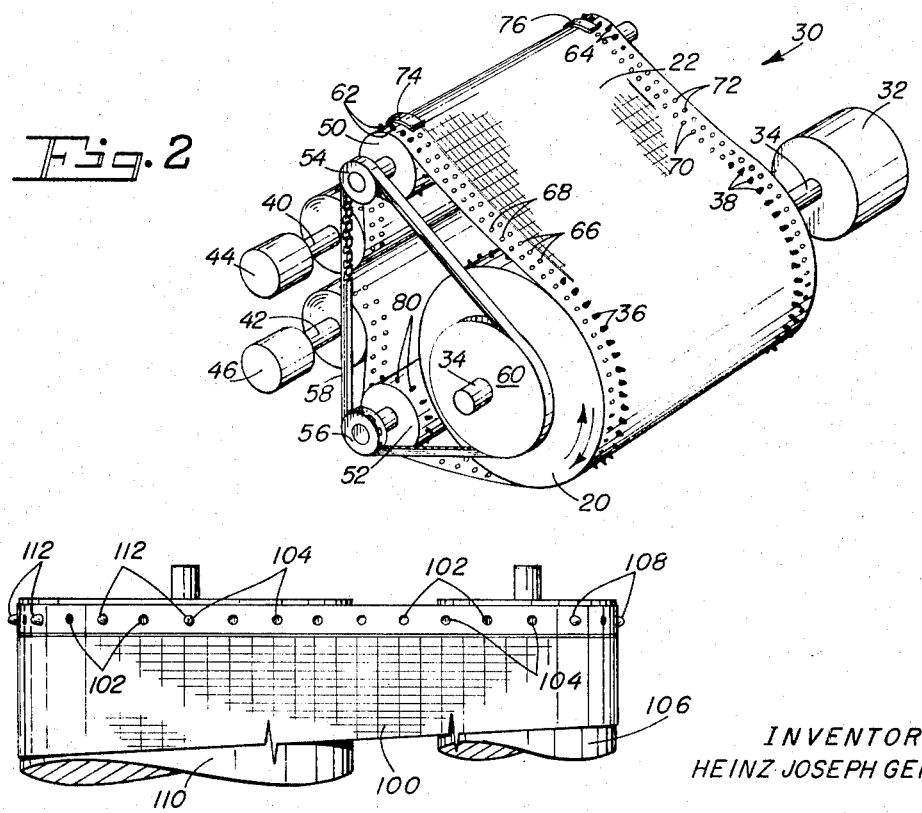
Fig. 2
Fig. 3
INVENTOR
HEINZ JOSEPH GERBER
Attorneys

3,759,433

METHOD AND APPARATUS FOR TRANSPORTING A STRIP OF RECORDING MATERIAL

BACKGROUND OF THE INVENTION

This invention relates to data recording or plotting mechanisms, and is more particularly directed to the method and apparatus for transporting a strip of recording material past a data recording head.

Data recording devices which introduce or plot graphic information on long strips of plotting paper or other recording media with the strip moved longitudinally of itself in one coordinate direction and the recording head moved transversely of the strip in another coordinate direction are well known in the art. In some of these devices, data is plotted by connecting the recorder directly to a measuring device and recording the measured information in analog form simultaneously with measurement of selected parameters. In other devices, data may be transferred to the recording medium at some time subsequent to the original generation of the data. In devices of the latter type, data may be taken from an intermediate source, such as a coded tape on which information is recorded in digital form, and converted to an analog form for plotting on the strip.

In both cases described above, it is important that the recording strip be advanced in a precise and controlled manner so as to be positioned accurately relative to the pen or other data recording head. Where data is recorded directly as it is measured, the strip is usually advanced at a uniform rate since the data is generally measured on a time basis and the time variations may be of principal importance. In other situations, the feed rate of the strip may not be uniform. In fact, when digital information is converted to a two dimensional drawing or graphic the direction of the strip feed usually is reversed from time to time in order to completely describe the drawing or graphic.

In previously known recording devices of the foregoing character, a strip of recording material is drawn from a storage roll and moved past a data recording head by a drive mechanism, such as a sprocket wheel, having pins or the like which drivingly engage configurations such as depressions, dimples, or, more commonly, apertures located along the edge of the material. The entire load required to draw the recording material from storage is applied to the same apertures, or the like, which are used to position it with respect to the data recording head. If the recording material inadvertently becomes caught or is rapidly accelerated during speed changes or stops and starts of the recording device, the forces imposed on the material may cause it to become torn or deformed in the vicinity of the configurations, or if a given longitudinal portion of the material is moved back and forth many times past the data recording head, the configurations may become distorted through wear due to relatively large forces existing between the configurations and the driving pins. Such deterioration of the configurations leads to inaccuracies in the plotted data because when such deterioration is present the recording medium cannot be precisely positioned relative to the data recording head by the drive mechanism.

Accordingly, the general object of this invention is to disclose a method and apparatus for transporting a strip of recording material past a data head, and for accurately positioning the strip relative to such data head to eliminate or reduce data distortions due to deterioration of the apertures or other driving configurations of the recording material.

SUMMARY OF THE INVENTION

The present invention resides in an apparatus for transporting a strip of recording material past a data recording head and the method by which the apparatus carries out the transporting function. The apparatus is comprised basically of a strip positioning means located in the vicinity of a data head and an auxiliary strip feed means located between the positioning means and a means for storing the strip of recording material. The strip of recording material has a plurality of engagement configurations, such as apertures, located along one or both of its longitudinal edges. The feed means includes sprocket pins or other engaging elements which cooperate with a first set of the engagement configurations to feed the strip to the positioning means, and the positioning means also includes sprocket pins or other engaging elements which cooperate with a second set of the engagement configurations to position the strip relative to the data head. The feed means and the positioning means are driven in synchronism and in such relationship that a slight amount of slack is maintained in the recording strip between the feed means and the positioning means. By maintaining such slack, the positioning means need exert only minimal forces on the recording strip without damaging the second set of engagement configurations which locate the strip on the positioning means. The positioning means may be comprised essentially of a drum with pins for engaging the configurations of the strip. The strip is supported on the drum surface during its movement past the data head. If the recording strip is to be moved longitudinally of itself in both forward and reverse directions past the data head, two feed means are used, one on either side of the positioning means.

BRIEF DESCRIPTION OF THE DRAWINGS

FIG. 1 is a perspective view of a plotting system including a drum plotter in which a transporting apparatus embodying the invention is employed.

FIG. 2 is a perspective view of the transporting apparatus of the drum plotter of FIG. 1.

FIG. 3 is a fragmentary frontal view of a transporting apparatus comprising another embodiment of the invention.

DESCRIPTION OF THE PREFERRED EMBODIMENT

FIG. 1 shows a plotting system, generally designated 10, in which the transporting method and apparatus of the present invention are employed. The plotting system 10 is generally composed of a computer 12 and a drum plotter 14 having a data recording head 18 and plotting drum 20. Coded information which is recorded in digital form on a tape 16 is read by the computer 12 and converted to command signals transmitted through a cable 24 to drive motors for the data recording head 18 and the plotting drum 20. The drum 20 carries a strip 22 of recording material in the longitudinal direction past the data recording head 18 which moves in the direction transverse to the strip. The longitudinal and transverse directions correspond respectively to X and Y coordinate directions, and the commands derived from the computer and applied to the motors for the recording head and plotting drum accordingly represent X and Y coordinate command signals. The illustrated strip 22 is a strip of recording paper bearing graph markings in the central portion between its lateral edges; however it could have a plain or undifferentiated surface for drawing figures or graphics. The data recording head 18 carries a pen which is engageable with the strip 22 to enable it to draw on the strip a graphic representation of the coded information on the tape 16.

In FIG. 2, the novel transporting apparatus 30 which engages and translates the strip 22 of recording material, in this case, a strip of recording paper, is shown removed from the housing of the drum plotter 14 for clarity. The transporting apparatus is composed basically of a positioning means and a feed means. While other devices might be employed, the positioning means in the embodiment of FIG. 2 is comprised of the plotting drum 20, a plotting drum drive motor 32 and a drive shaft 34. Commands derived from the computer 12 of FIG. 1 are supplied to the plotting drum drive motor 32 which is connected to the drum 20 by means of the drive shaft 34 to rotate the drum 20 in either direction as indicated by the arrows. The plotting drum 20 is provided with engaging elements which engage the strip 22 of recording material to position it on the drum opposite the data recording head. The engaging elements may take various forms and are shown in FIG. 2 as consisting of two sets of sprocket pins 36, 36 and 38, 38, with each set being located adjacent a respective one of the opposite ends of the drum 20. These pins mate with engagement configurations in the form of apertures 66, 66 and 70, 70 in the strip 22, the apertures 66, 66 comprising one set of apertures located along one longitudinal edge of the strip and cooperating with one set of pins 36, 36 and the apertures 70, 70 comprising another set of apertures located along the other longitudinal edge of the strip 22 and cooperating with the other set of pins 38, 38.

The strip transporting apparatus 30 is also provided with storage means at each side of the plotting drum 20 for holding one end portion of the strip 22 translated by the apparatus. The storage means on one side of the drum is illustrated as comprising a storage shaft 40 and a storage shaft take-up motor 44 connected to the shaft 40. On the other side of the drum it is illustrated as comprising a storage shaft 42 and a storage shaft take-up motor 46 connected to the shaft 42. The end portions of the strip 22 are received on the storage shafts 40, 42 in the form of storage rolls and are so connected to the associated shafts so that rotation of either shaft produces rotation of its associated storage roll. The take-up motors 44 and 46 bias the shafts to rotate in the winding in or take-up direction. That is, when the plotter is in operation, one motor 44 or 46 allows its shaft to be rotated by the pull of the strip 22 thereon against the biasing force of the motor, to allow the strip to be paid from the associated storage roll, and the other motor 44 or 46 rotates its shaft to cause its associated storage roll to take up the strip as it comes off of the drum 20. If the particular plotting system requires that strip 22 move only in a single direction, of course, only one storage roll drive motor may be required.

In accordance with the present invention, feed means are provided for engaging the strip 22 of recording material and moving the strip toward the positioning means during the plotting process without depreciating the quality or integrity of the engagement configurations employed by the positioning means. In cases where the strip is to be moved longitudinally in both directions two such feed means are provided and located respectively on opposite sides of the positioning means. More particularly, each feed means includes an auxiliary feed roller which is located between the associated storage roll and the plotting drum and which engages the strip to advance it toward the plotting drum by means of engaging elements cooperating with engagement configurations of the strip not used by the plotting drum for positioning the strip.

The transporting apparatus of FIG. 2 is designed for moving the strip of recording material in both directions and therefore includes two feed means. An auxiliary feed roller 50 forms the principal component of one of these feed means and is mounted by a supporting structure (not shown) in parallel relationship with the plotting drum 20 and between the drum 20 and the associated storage shaft 40. The strip 22 of recording material leaves the drive shaft 40 and passes over the feed roller 50 to the plotting drum 20 during the plotting process when the drum 20 rotates in the clockwise direction, as viewed in FIG. 2. Another feed roller 52, similar to the roller 50, is located at the side of the plotting drum 20 opposite from the roller 50 in a parallel relationship with drum 20. This feed roller 52 forms the principal component of the other of the feed means of the transporting apparatus of FIG. 2.

The auxiliary feed rollers 50 and 52 are connected to geared pulleys 54 and 56, respectively. A third geared pulley 60 is secured to the drum drive shaft 34, and a timing belt 58 extends over the three pulleys 54, 56 and 60 to positively synchronize the rotation of the rollers 50 and 52 with that of the plotting drum 20, the two rollers 50 and 52 and the drum being driven in common by the motor 32. The number of teeth on the geared pulleys 54, 56 and 60 which mesh with the teeth of the timing belt 58 and the number of engaging elements on the two rollers 50, 52 and drum 20 are selected so that the advancement or speed of the strip of recording material on the engaging elements of the rollers is the same as that on the engaging elements of the drum. As the drive motor 32 rotates the drum 20 and the two feed rollers 50 and 52, the strip 22 is drawn from one of the storage shafts 40 or 42, is engaged by the associated feed roller 50, or 52, is delivered to the plotting drum 20 where plotting takes place, and is then returned to the other storage shaft over the other feed roller. A reversal of the direction of rotation of the drum 20 is accompanied by a reversal in the direction of rotation of the feed rollers 50 and 52 so that the strip 22 is fed to the plotting drum from the other storage shaft by the other feed roller.

Assume now that the strip is moved in the direction corresponding to clockwise rotation of the drum 20 as viewed in FIG. 2. In this situation the feed roller 50 serves to pull the strip from the storage shaft 40 and to feed it to the drum, and the drum serves to translate it past and position it relative to the recording head 18. To provide for driving engagement with the strip 22 by the feed roller, the feed roller is equipped with engaging elements illustrated as two sets of sprocket pins 62, 62 and 64, 64. Each set of these pins 62, 62 or 64, 64 is located in a plane slightly displaced from and parallel to the plane containing a respective one of the sets of the engaging elements or pins 36, 36 or 38, 38 on the plotting drum 20. In the case of the illustrated strip 22, the engagement configurations thereof which mate with the feed roller sprocket pins 62, 62 and 64, 64 are sets of apertures 68, 68 and 70, 70 each of which sets is located along a respective one of the longitudinal edges of the strip. The feed roller pin engaging set of apertures 68, 68 is located along the same longitudinal edge of the strip as is the drum pin engaging set of apertures 66, 66, and the feed roller pin engaging set of apertures 72, 72 is located along the same longitudinal edge of the strip as is the drum pin engaging set of apertures 70, 70. Therefore, along one edge of the strip the apertures 66, 66 and 68, 68 engage sprocket pins 36, 36, and 62, 62 respectively, while along the other edge of the strip the apertures 70, 70 and 72, 72 engage sprocket pins 38, 38 and 64, 64 respectively. To insure that the feed roller sprocket pins 62, 62 and 64, 64 remain engaged with the apertures 68, 68 and 72, 72 while the strip 22 moves over the feed roller 50, fixed guides 74, 76 are mounted to the supporting structure (not shown) and overlie the area of the strip engaged by the pins.

As the strip 22 is started, stopped, rapidly accelerated or moved at constant speed during translation from the storage shaft 40 to the drum 20, the necessary driving forces or loads are transmitted to the strip through the apertures 68, 68 and 72, 72, by the sprocket pins 62, 62 and 64, 64 of the feed roller 50. At the same time, the positioning of the strip 22 relative to the surface of plotting drum 20, and therefore relative to the recording head 18, is established by the engagement of the other apertures 66, 66 and 70, 70 with the sprocket pins 36, 36 and 38, 38 of the drum. Accordingly, distortion or tearing of the apertures 68, 68 and 72, 72 engaged by the feed roller pins does not interfere with or degrade the accuracy of the positioning of the strip relative to the drum 20. By providing a limited amount of slack in the strip between the feed roller 50 and the plotting drum 20, the loads in the strip portion between the shaft 40 and the roller 50 are isolated from the drum 20 and slight misregistrations between the strip and the feed roller due to torn or distorted apertures are accommodated without affecting the positioning of the strip relative to the drum by the drum pins 36, 36 and 38, 38. It will therefore be understood that the drum pins 36, 36 and 38, 38 impose only relatively small driving forces on the strip 22 and are therefore unlikely to tear or deform their associated apertures 66, 66 and 70, 70, thereby assuring accurate positioning of the strip relative to the recording head.

Assume now that the strip is moved in the direction corresponding to counterclockwise rotation of the drum as viewed in FIG. 2. In this situation the feed roller 52 serves the same feeding function as previously described for the roller 50. That is, it pulls the strip from the storage shaft 42 and feeds it to the plotting drum 20. The apertures 68, 68 and 72, 72 of the strip 22 are drivingly engaged with the roller 52 by means of one set of sprocket pins 80, 80 on end of the roller and by another similar set of sprocket pins which are on the other end of the roller and not visible in FIG. 2. A pair of fixed guides (also not visible) similar to guides 74, 76 overlie the area of the strip engaged by the sprocket pins to insure that the strip remains engaged with the pins.

FIG. 3 is a fragmentary view of a transporting apparatus comprising another embodiment of this invention. The drive motors and storage rolls are the same as those shown in FIG. 2 and are omitted for simplicity. In this embodiment of the invention, the feed roller and the plotting drum have sprocket pins which lie in the same plane. Nevertheless, the coengaging parts of the plotting drum and the strip which are used to position the strip relative to the recording head are independent of and distinctly different from the coengaging parts of the feed roller and the strip which are used to advance the strip to the plotting drum, since the pins of the drum and those of the feed roller engage two distinct sets of apertures in the strip.

In FIG. 3, the strip 100 of recording material has along one longitudinal edge one row of apertures composed of a first set of apertures 102, 102 alternately spaced between a second set of apertures 104, 104. The feed roller 106 includes sprocket pins 108, 108 which engage the first set of apertures 102, 102. The plotting drum 110 includes sprocket pins 112, 112 which lie in the same plane as the pins 108, 108 and which have the same spacing as pins 108, 108, but they engage the apertures 104, 104 of the second set. The engagement of the apertures 102, 102 by the feed roller and the apertures 104, 104 by the plotting drum disassociates the strip feeding function from the step positioning function in substantially the same way as do the laterally spaced sets of sprocket pins and apertures in the embodiment of the invention shown in FIG. 2. With a small amount of slack in the strip 100 between the feed roller 106 and the plotting drum 110, positioning of the strip 100 in the vicinity of a data head by means of the plotting drum sprocket pins 112 is not affected by tearing or distortion of apertures 102 caused by the feed roller sprocket pins 108. It will, of course, be understood that the strip 100 along its other longitudinal edge may be provided with aligned sets of apertures similar to the apertures 102, 102 and 104 and 104, and that the feed roller and drum at their other ends may be provided with cooperating sprocket pins similar to the pins 108, 108 and 112, 112.

Although the method and apparatus for transporting a strip of recording material have been disclosed herein in several different forms, it will be understood by those skilled in the art that numerous substitutions and modifications can be made without departing from the spirit of the invention. For example, the feed rollers may be adjustably mounted either on their shafts or in the supporting structure so that the amount of slack between the feed rollers and plotting drum can be varied as desired. Although the feed rollers are driven by means of a toothed timing belt, equivalent apparatus, such as chains or gearing mechanisms, can be utilized with equally satisfactory results. The recording material employed may be a high grade plotting paper, celluloid or other flexible film suited to a particular recording process and the engagement configurations may take various shapes and may have side-by-side, staggered, alternating or other positional relationships with respect to one another. The transporting apparatus may be utilized in systems for recording or retrieving data from a strip of recording material. Accordingly, the present invention has been described in several specific embodiments by way of illustration rather than limitation.

I claim:

1. Apparatus for transporting along a prescribed path past a data head a strip of recording material having engagement configurations adjacent a longitudinal edge thereof, said apparatus comprising: positioning means for engaging a first set of engagement configurations located adjacent a longitudinal edge of a strip such as aforesaid and for thereby translating such strip longitudinally of itself relative to a data head; and feed means for engaging a second set of engagement configurations exclusive of the configurations of said first set and located adjacent the longitudinal edge of said strip and for thereby moving said strip toward said positioning means.

2. A transporting apparatus according to claim 1 wherein motor means are connected to both said positioning means and said feed means for synchronous operation of said positioning means and said feed means.

3. A transporting apparatus as defined in claim 1 wherein first and second storage means are provided for storing the respective end portions of the strip of recording material engaged by said positioning means; and wherein said feed means includes a rotatable strip engaging member, located along the prescribed path followed by the strip between said first storage means and said positioning means.

4. Apparatus for transporting a strip of recording material as defined in claim 3 wherein another feed means is provided and includes another rotatable member located along the prescribed path followed by the strip between said second storage means and said positioning means.

5. Apparatus for transporting a strip of recording material as defined in claim 1 wherein a first set of engaging elements are secured to the positioning means at locations mating with the first set of engagement configurations of the strip; and a second set of engaging elements are secured to the feed means at locations mating with the second set of engagement configurations of the strip.

6. A transporting apparatus as defined in claim 1 for translating a strip of recording material in which the engagement configurations are apertures wherein the positioning means includes a first set of sprocket pins distributed on the positioning means at locations mating with the first set of apertures in the strip of recording material; and the feed means includes a second set of sprocket pins distributed on the feed means at locations mating with the second set of apertures in the strip of recording material.

7. A transporting apparatus according to claim 1 wherein the positioning means includes a first rotatable member having an axis of rotation extending transversely of said strip and having a first set of radially extending sprocket pins angularly spaced about said axis of rotation, and wherein said feed means includes a second rotatable member having an axis of rotation extending transversely of said strip and having a second set of radially extending sprocket pins angularly spaced about said latter axis of rotation.

8. A transporting apparatus according to claim 7 wherein the axes of rotation of said first and second rotatable members are parallel to one another and said first and second sets of sprocket pins are located in parallel planes.

9. A transporting apparatus according to claim 7 wherein the axes of rotation of the first and second rotatable members are parallel to one another and the first and second sets of sprocket pins are located in a common plane.

10. A transporting apparatus as defined in claim 7 wherein the first rotatable member of the positioning means is a rotatable drum having sets of sprocket pins extending radially of the drum in planes at opposite ends of the drum.

11. A transporting apparatus as defined in claim 1 wherein said positioning means includes first engaging means for engaging said first set of engagement configurations adjacent said longitudinal edge of the strip of recording material; said feed means includes second engaging means for engaging said second set of engagement configurations adjacent said longitudinal edge of said strip of recording material, and coupling means are connected between said positioning means and said feed means for operating said positioning means and said feed means simultaneously and synchronizing the engagement of first engaging means with the first set of engagement configurations and said second engaging means with said second set of engagement configurations as the strip of material is transported.

12. A transporting apparatus as defined in claim 11 wherein said first and second engaging means are first and second sets of sprocket pins with the pins comprising said first set being located in a first common plane and with the pins comprising said second set being located in a second common plane different from said first plane.

13. A transporting apparatus as defined in claim 12 wherein said first and second sets of sprocket pins are located in parallel common planes.

14. A transporting apparatus as defined in claim 11 wherein said first and second engaging means are first and second sets of sprocket pins all of which sprocket pins are located in a common plane.

15. The method comprising the steps of providing a strip of recording material having first and second mutually exclusive sets of engagement configurations arranged longitudinally along said strip; feeding said strip longitudinally of itself from a first station along a path of travel of said strip toward a data head by means of said first set of engagement configurations; and at a second station along the path of travel of said strip different from said first station, positioning said strip relative to the data head by means of said second set of engagement configurations.

16. A method as defined in claim 15 wherein said step of feeding said strip is performed at a first station along the path of travel of said strip which first station is located in advance of said second station with respect to the direction of travel of said strip, and further including the step of maintaining slack in said strip between said first and second stations.

17. A method as defined in claim 15 wherein said step of providing a strip of recording material comprises providing a strip of recording material having a first set of engagement configurations in the form of a first set of engagement apertures and a second set of engagement configurations in the form of a second set of engagement apertures.

18. The method for translating a strip of recording material, which method comprises the steps of providing a strip of recording material having first and second sets of engagement configurations, said sets being mutually exclusive of one another and the engagement configurations of both sets being distributed longitudinally along said strip; establishing an engagement of said strip at a first location along said strip through said first set of engagement configurations; feeding said strip longitudinally of itself toward a data head by means of the engagement of said strip established through said first set of engagement configurations; establishing another engagement of said strip at a second location along said strip longitudinally spaced from the first location through said second set of engagement configurations; and positioning said strip relative to the data head by means of the other engagement of said strip established through said second set of engagement configurations.

19. A method for translating a strip of recording material as defined in claim 18 wherein said step of providing a strip of recording material comprises providing a strip of recording material having first and second sets of engagement apertures constituting respectively said first and second sets of engagement configurations; and wherein said step of establishing an engagement of said strip through said first set of engagement configurations comprises inserting a first set of sprocket pins in said first set of engagement apertures and said step of establishing another engagement of said strip through said second set of engagement configurations comprises inserting a second set of sprocket pins in said second set of engagement apertures.

20. A method of translating a strip of recording material as defined in claim 19 wherein said step of providing a strip of recording material further comprises providing a strip of recording material having said first and second sets of engagement apertures arranged in first and second rows respectively, said rows being parallel rows extending longitudinally of said strip.

21. A method of translating a strip of recording material as defined in claim 19 wherein said step of providing a strip of recording material further comprises providing a strip of recording material having the engagement apertures of said first set arranged alternately with the engagement apertures of said second set in a row extending longitudinally of said strip.

22. A method of translating a strip of recording material as defined in claim 18 further including the step of maintaining slack in said strip of recording material between the engagement of said strip established through said first set of engagement configurations and the engagement of said strip established through said second set of engagement configurations.

23. Apparatus for a data recording or retrieving system comprising in combination a strip of recording material having engagement configurations extending longitudinally thereof in first and second mutually exclusive sets; positioning means engaging the engagement configurations of the first set in said strip to translate said strip longitudinally of itself relative to a data head; and feed means engaging the engagement configurations of the second set in said strip to translate said strip longitudinally of itself toward said positioning means, the portion of said strip between said positioning means and said feed means having a limited amount of slack so that said positioning means and said feed means may move said strip of recording material a limited distance independently of one another.

* * * * *